Dec. 23, 1969

W. GANTER ET AL 3,485,035

TUNING FORK DEVICES

Original Filed June 7, 1966

INVENTORS
Wolfgang Ganter
Friedrich Assmus

BY
Watson, Cole, Grindle & Watson
Attys.

United States Patent Office 3,485,035

Patented Dec. 23, 1969

3,485,035

TUNING FORK DEVICES

Wolfgang Ganter, Schramberg-Sulgen, and Friedrich Assmus, Schramberg, Wurttemberg, Germany, assignors to Messrs. Gebruder Junghans Gesellschaft mit beschrankter Haftung, Schramberg, Wurttemberg, Germany, a corporation of Germany Original application June 7, 1966, Ser. No. 555,766. Divided and this application Apr. 15, 1969, Ser. No. 816,265

Claims priority, application Germany, June 8, 1965, J 28,304

Int. Cl. G04c *3/00*

U.S. Cl. 58—23 4 Claims

ABSTRACT OF THE DISCLOSURE

Tuning fork arrangement maintained vibrating in an electromagnetic manner particularly for movement regulating oscillator for time-keeping devices in which a permanent magnet cooperates with two coils, one a control coil and the other a driving coil with the tuning fork of ferromagnetic material. The ferromagnetic element reaches the area of the coils and a permanent magnet connects the bridge of the tuning fork with the permanent magnet arrangement.

This application is a division of applicant's co-pending application, Ser. No. 555,766, filed June 7, 1966.

The invention relates to a tuning fork arrangement, held in vibration in an electromagnetic manner, as a movement regulating oscillator for time keeping devices with a permanent magnet arrangement having a magnetic path essentially closed and with at least two coils, a control coil and a driving coil, in relation to which at least one pole of the magnet arrangement can execute a relative movement.

Tuning fork arrangements are particularly suitable as movement regulators for small watches. The known tuning fork oscillators have a relatively large swinging mass, as a result of which the dependence of the oscillating frequency on position becomes relatively large.

It is an object of the invention to create a simple tuning fork arrangement which, with a relatively small swinging mass, has a high degree of effectiveness and has a small dependence of the frequency on the position. The invention is characterized by the fact that the permanent magnet arrangement which consists of a tuning fork is made of ferromagnetic material, a further magnetic element projecting into the area of the coils as well as of permanent magnets connecting the bridge of the tuning fork with the ferromagnetic element. The coils have been developed without an iron core.

The ferromagnetic element may be a base plate carrying the coils, or a second tuning fork, in which case the coils are attached to a separate support. Preferably the coils are arranged coaxially and adjoin each other.

The tuning fork arrangement according to the invention has a particularly small swinging mass, for which reason the oscillating frequency can be influenced very little by outside impacts and also by varying positions of a watch. The use of coils without iron cores also makes possible a largely free oscillation of the prongs of the tuning fork, so that a disturbance of the isochronism is largely eliminated.

Further objects of the invention will be apparent from the following description when considered in connection with accompanying drawings in which.

Figure 1:
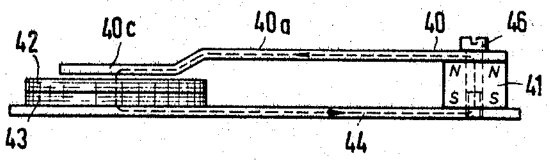
FIG. 1 is a side view showing a tuning fork arrangement according to the invention, with the permanent magnet arranged fixedly and is connected with the bridge of the tuning fork.
Figure 2:
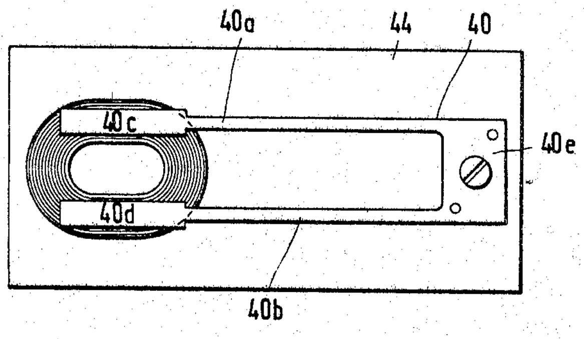
FIG. 2 is a top view of the embodiment according to FIG. 1.

In FIGS. 1 and 2, a tuning fork 40, made of ferromagnetic material, has been shown, whose arms 40*a* and 40*b* have been broadened at the ends 40*c* and 40*d* in the direction of the oscillation. They oscillate above the widths of the coils of a coil arrangement consisting of the coils 42 and 43, which arrangement has been provided fixed on a magnetic return element 44 in the form of a base plate. The coils 42 and 43 have been made without iron cores. The tuning fork 40 is attached to the base plate 44, with its bridge element 40*e*, with the aid of the screw 46 and with interposition of a permanent magnet 41. The course of the magnetic flux has been shown in FIG. 1 by broken lines and arrows. In the case of a firmly closed magnetic circuit this results in a very small oscillating mass.

Figure 3:
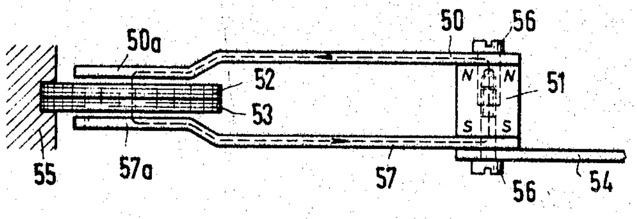
FIG. 3 is a side view of a modified structure in which two tuning forks have been provided, whose bridge elements are connected with one another by a permanent magnet.

FIG. 3 shows another embodiment by way of example, in which two tuning forks 50 and 57 have been provided according to FIGS. 1 and 2, which serve as magnetic return elements. They overswing, with their ends 50*a* and 57*a*, the coil arrangement consisting of coils 52 and 53. The coil arrangement 52 and 53 has been provided on a fixed support 55, and here also the coils are made without an iron core. The bridge elements of the tuning forks 50 and 57 are connected with one another with the aid of screws 56 and with the interposition of a permanent magnet 51, and have been attached to a base plate 54. The course of the magnetic flux is shown by way of a broken line and arrows.

The coils 42 and 43 or 52 and 53 act together with the ends of the prongs of the tuning fork, representing the poles of the magnetic system. The prongs contain a control coil for example, 42 or 52, and a driving coil 43 or 53. The control coil 42 or 52, lies preferably in the input circuit of an electronic amplifier circuit as generally known for the purpose of maintaining the oscillations of a mechanical oscillator. By the change of the magnetic power flux caused by the oscillation, a control voltage is produced in the control coil, which controls the electronic amplifier. The driving coil 42 or 53 lies in the output circuit of the amplifier and is controlled or operated by the output impulses supplied by the amplifier circuit, as a result of which a driving magnetic force is exerted on the prongs of the tuning fork.

The coils 42 and 43 or 52 and 53 have been arranged closely adjoining coaxially and contain no iron cores, so that no magnetic pull-back forces depending on the oscillations will result. The arrangement of the coils naturally can also be the reverse, that is to say, the coils 42 and 43, for example, can be exchanged so that the control coil 42 will rest on the base plate 44 while the driving coil 43 adjoins the ends 40*c* and 40*d* of the tuning fork 40.

We claim:

1. Tuning fork arrangement maintained vibrating in an electromagnetic manner, as a movement regulating oscillator for time keeping devices with a permanent magnet arrangement with an essentially closed magnetic path comprising at least two coils, one a control coil and the other a driving coil in relation to which at least one pole of the magnet arrangement can execute a relative movement, the tuning fork being of ferromagnetic material, a further ferromagnetic element reaching the area of the coils, and a permanent magnet connecting the bridge of the tuning fork with the ferromagnetic element, the coils being without an iron core.

2. Tuning fork arrangement according to claim 1, in which the ferromagnetic element is a base plate bearing the coils.

3. Tuning fork arrangement according to claim 1, in which the ferromagnetic element is a second tuning fork and the coils are attached to a separate support.

4. Tuning fork arrangement according to claim 1, in which the coils are arranged coaxially and closely adjoining each other.

References Cited

UNITED STATES PATENTS 2,928,308 3/1960 Godbey ---------------- 84—409

FOREIGN PATENTS 1,334,088 6/1963 France.

RICHARD B. WILKINSON, Primary Examiner

EDITH C. SIMMONS, Assistant Examiner

U.S. Cl. X.R.

58—457; 310—36